Sept. 4, 1962  E. DASH  3,052,793

STUD WELDING GUN

Filed Feb. 4, 1960

INVENTOR.
EDWARD DASH
BY
Miketta and Glenny
ATTORNEYS.

United States Patent Office 3,052,793
Patented Sept. 4, 1962

3,052,793
STUD WELDING GUN
Edward Dash, 710 W. Columbia, Long Beach 6, Calif.
Filed Feb. 4, 1960, Ser. No. 6,716
8 Claims. (Cl. 219—98)

This invention relates generally to electric arc welding equipment and more particularly to a light weight, compact, easily handled, automatic arc stud welding gun for end welding a metallic stud to a metallic work member. The invention also particularly relates to a novel electro-mechanical device for use in a stud welding gun or the like to retract and to project a part of the welding gun upon energization and de-energization of the device.

Heretofore, prior conventional automatic stud welding guns have been generally heavy, bulky, and relatively cumbersome. Such prior guns have not been easily handled and their weight directly limits the rate of producing stud welds due to fatigue of the operator. In addition, a bulky gun is extremely difficult and sometimes impossible to manipulate in or reach small confined areas. These prior guns have also been characterized by a relatively large number of parts which must be retained in proper assembly and which contribute not only to frequent and costly maintenance and repair, but also to unreliability in performance resulting in non-acceptable welds.

Prior proposed stud guns have included means for providing constant arc length such as an internal clutching mechanism between an armaure and a stud holder (Patent 2,413,189). This invention contemplates a novel, simple and effective arrangement for maintaining a constant arc length without the use of clutch means and with relatively few parts. Moreover, prior stud guns have utilized solenoid means of generally conventional, well known design. This invention, however, embodies in a stud gun a novel construction of an electro-mechanical device or solenoid coil-spring means which affords advantages of construction and operation not achieved in prior stud guns.

It is therefore an object of this invention to provide a compact, light weight, stud welding gun adapted to be easily handled and manipulated while stud welding.

An object of the invention is to provide such a welding gun which has few moving parts, which is constructed to facilitate maintenance, and which is consistently reliable in operation.

It is another object of the invention to disclose and provide a novel solenoid coil-spring assembly which may be adapted for use in such a stud welding gun or the like to provide both retraction and projection of a stud held by the gun.

A further object of the invention is to provide a stud welding gun which is operable at relatively low welding current values and which can therefore be used on light gauge sheet metal without danger of burn-through.

An importnt object of the invention is to provide a novel solenoid coil-spring which serves to carry the entire welding current of the stud gun and which also serves to store in the solenoid coil-spring potential mechanical energy which was produced during current flow.

Generally stated, the invention comprises a solenoid coil-spring operable within a barrel portion of a stud welding gun housing. The solenoid coil-spring assembly includes a fixed or stationary core, a movable armature, and a solenoid coil-spring biasing the core and armature into spaced relation. The fixed core is connected to a welding current source and the armature is provided with an armature portion which extends through a port in the front end of the barrel The armature portion is provided with a means for holding a stud to be welded so that a unitary stud-holding armature means is provided. The solenoid coil-spring has electrically conductive seating contact at opposite ends on the fixed core and on the movable armature respectively, and normally biases the armature toward the front end of the barrel and the stud into a projected position. Thus the fixed core solenoid coil-spring, and armature, are electrically connected in series for the passage of welding current therethrough to the stud-holding means and stud, respectively, to produce a welding arc between the stud and work piece. Upon flow of welding current, the solenoid coil-spring and fixed core may act as a solenoid to retract the armature a preselected distance. Such retraction further compresses the solenoid coil-spring and stores potential energy therein while the spring is providing an electrical path for flow of current. When welding current flow ceases in accordance with a pre-selected welding cycle, the stored spring energy is released and the solenoid coil spring projects the armature and stud forwardly, the stud plunging into a pool of molten metal on the work member formed during the welding arc. The invention also contemplates means for simply and effectively adjusting and controlling the amount of travel of the stud or armature during retraction and projection thereof and thereby controlling the length of the welding arc and the distance of the plunge of the stud into the molten metal.

Various other objects and advantages of the invention will be readily apparent from the following description of the drawings in which an exemplary embodiment of the invention is shown.

Figure 1:
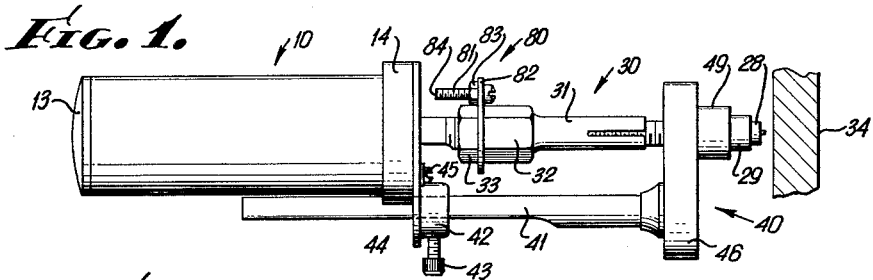
FIG. 1 is a top plan view of a stud welding gun embodying this invention.
Figure 2:
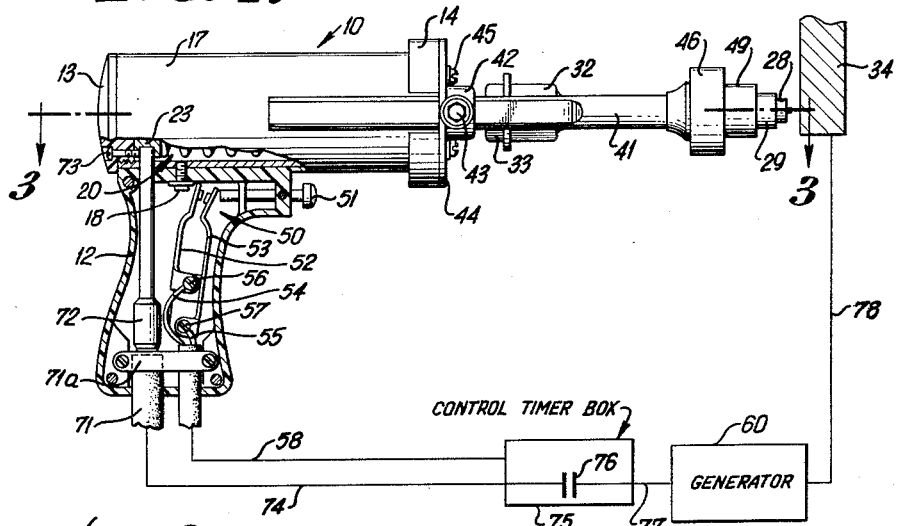
FIG. 2 is a side view of FIG. 1 partly in section and schematically showing electrical connections and circuitry between the gun and the work member.

A preferred embodiment of an automatic arc stud welding gun embodying this invention may comprise in general a housing 10 including a cylindrical barrel 11 and a pistol-like gun grip means 12, an electro-mechanical device or solenoid coil-spring assembly 20 (FIG. 3) within the barrel, a stud holding means 30 carried by the solenoid coil-spring assembly 20, ferrule supporting and positioning means 40 carried by the housing 10, switch actuating means 50 carried by the gun grip means 12, and a generator source of electricity indicated generally at 60. The shape of the stud welding gun generally resembles that of a pistol.

The barrel 11 may be made of generally cylindrical hollow tube stock of suitable magnetic material, such as low carbon steel, and may be provided with internal threads at opposite ends to threadedly receive a rear cap 13 and a front cap 14 provided with an axial port 15. A metallic sleeve bearing 16 may be pressed in the port 15. A cover 17 may enclose the barrel 11, such cover 17 and the end caps 13 and 14 being made of suitable dielectric material such as well known plastic and synthetic compositions. The front cap 14 may be provided with a relatively thick circumferential flange 14a having a diameter somewhat greater than the diameter of the cover 17.

The electro-mechanical device or solenoid coil-spring assembly 20 may comprise a fixed or stationary core member 22, a longitudinally movable armature member 24 spaced therefrom and a solenoid coil-spring 26 ensleeved over and extending between said members 22 and 24. Fixed core member 22 may be seated against the internal face of rear cap 13 and held thereagainst by any suitable well known means. The rear end of the fixed core member 22 may be provided with a circumferential flange 23 which provides a seat 23a for one end of solenoid coil-spring 26 in electrically conductive contact therewith.

Armature member 24 may be provided with a stepped circumferential flange 25 intermediate its ends for seating against the internal surface of the front end cap 14. The flange 25 also provides a seat 25a against which the front end of the solenoid coil-spring 26 may seat and contact in electrically conductive contact relation. The armature 24 includes an armature portion 27 of reduced diameter which extends through the sleeved port 15 and projects therefrom. The armature portion 27 may be provided with a longitudinally flat-surface 27a for cooperation with a set screw 27b carried in a threaded radial bore provided in flange 14a for restraining the armature 24 against rotation while permitting sliding axial movement of the armature with respect to the port 15.

The fixed core member 22 and armature member 24 are made of magnetic material such as low carbon steel and together with the barrel 11 which may be made of magnetic material, comprise the magnetic circuit components of the solenoid assembly. The solenoid coil-spring 26 is a single coil of homogeneous material and is preferably made of high conductivity heavy gauge copper alloy or commercially pure copper. The solenoid coil-spring 26 electrically connected in series with the fixed core member 22 and armature 24 thus not only provides a path of relatively low electrical resistance for flow of the welding current but also serves mechanically to provide a spring under compression between the fixed core and the armature. The spring 26 is normally under some compression and biases the armature 24 into spaced relation with respect to the fixed core member 22. The electrical contact of the ends of the spring 26 with the flanges 23 and 25 may be enhanced by soldering or welding or other suitable well known means.

Stud holding means 30 may be threadedly connected to the front end of the armature portion 27 by means of an internally threaded, enlarged socket 32 in threaded engagement with external threads on the armature portion 27. The external configuraton of the socket 32 may be polygonal. At the opposite and front end of the stud holding means 30 a generally cylindrical stud-grasping portion 31 is provided for frictional grasping and holding of the non-welding end of a stud 28. In this example, the stud-grasping portion 31 may comprise semi-cylindrical end sections 31a adapted to frictionally engage threads provided on the non-welding end of the stud 28. It will be readily understood that other stud-grasping means may be used.

It is thus apparent that the armature member 24 and the stud holding means 30 are so interconnected and related that they form a single unitary armature means to which a stud may be connected and which is directly responsive to the electromagnetic forces produced by flow of current through the solenoid coil-spring 26 and also the mechanical forces stored in spring 26 during passage of welding current therethrough.

Means for supporting and positioning a ferrule 29 at the welding end of stud 28 may include an extension leg 41 supported from the housing 10 by an end plate 44 secured to the face of the end cap 14 as by screws 45. Plate 44 may include a sidewardly extending ported extension 42 for longitudinally slidably mounting the leg 41. Leg 41 may have a flatted longitudinal surface 41a cooperable with a set screw 43 for retaining the leg 41 against longitudinal and rotational movement.

Leg 41 extends parallel to the armature portion 27 and carries at its front end a foot member 46 secured as by a stud bolt 47. The shank of bolt 47 extends through an elongated slot 48 in the foot member 46 to permit lateral adjustment of the foot member 46 with respect to the axis of the armature portion 27. Foot member 46 is provided with a port 46a to receive stud 28. An enlarged recess 49a coaxial with port 46a retains a ferrule receiving member 49. The ferrule receiving member 49 may be provided with a ported end wall through which passes the welding end of stud 28 and which is provided with a cylindrical recess 29a adapted to receive and frictionally hold ferrule 29. Ferrule 29 may thus be adjusted laterally with respect to the axis of stud 28 by lateral adjustment of the foot member 46 with respect to the end of leg 41. The ferrule 29 may be longitudinally adjusted relative to the stud 28 by means of the leg 41 and the ported end plate 44.

The pistol-like gun grip means 12 may be made of suitable dielectric material and may be attached to barrel 11 by suitable screws 13. Grip means 12 may be hollow and may house the switch actuating means 50. Switch actuating means 50 may comprise a pair of biased switch elements 52, 53 connected to leads 54, 55 respectively by terminal screws 56, 57. Switch element 53 may be urged against element 52 by a trigger pin 51 carried by the means 12 and adapted to be actuated by a finger of an operator.

Grip means 12 also encloses a connector pin 72 which extends through barrel 11 and into an aligned bore in flange 23 in the fixed core member 22. A suitable set screw 73 may extend through the rear cap 13 and through an aligned bore in the flange 23 for holding contact with the end of the connector pin 72.

The butt end of the grip means 12 may be ported for entry of lead 58 into the grip means 12 and for connection of the leads 55 and 54 of the lead 58. Similarly, cable 71 may be inserted into grip means 12 through a port therein, said cable 71 carrying the connector pin 72, said cable 71 and lead 58 being suitably retained by a cable strap assembly 71a.

The electrical circuitry connecting the connector pin 72 and the switch actuating means 50 is well known and may include a control timer box 75 connected to lead 58. A generator 60 for supplying electrical energy may be connected to the cable 71 through cable 74, a circuit breaker 76 and a cable 77. The generator may also be connected by lead 78 to the work member 34. It will be understood that the control timer box 75 includes a control timer circuit (not shown) which closes the circuit breaker 76 for a preselected period of time to permit welding current to flow through the circuit provided by the cable 71, connector pin 72, fixed core member 22, solenoid coil-spring 26, armature 24, armature portion 27, stud holder 30, stud 28 and thence in an arc to the work member 34, lead 78 and back to the generator 60.

Means for adjustably controlling the length of the welding arc drawn between the stud 28 and the work member 34 is generally indicated at 80 and may include a plate 82 retained on the polygonal socket end 33 of the stud holder 30 in selected spaced relation to the end plate 44 on the housing 10. Plate 82 may threadedly carry an adjustment screw 81 which is directed toward the end cap 14 on the housing 10. The screw 81 may be locked in selected position with respect to plate 82 by a lock nut 83. The end 84 of screw 81 upon contact with the opposed surface of the end cap 14 will limit retraction of the armature means.

Figure 3:
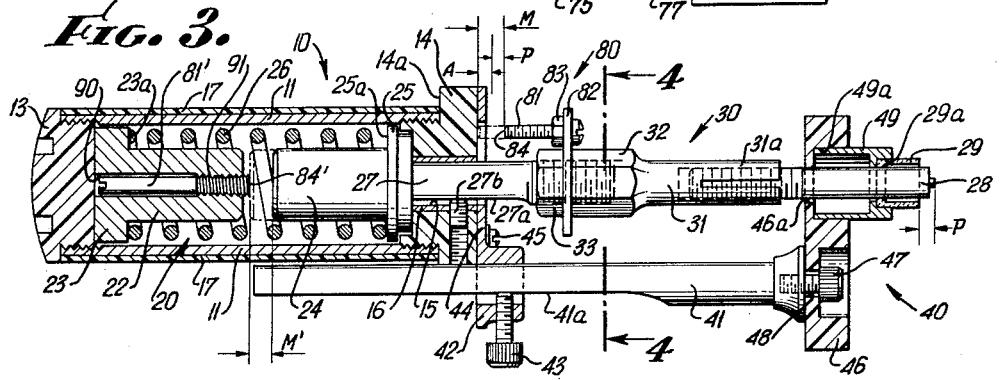
FIG. 3 is a sectional view taken in the plane indicated by line 3—3 of FIG. 2.
Figure 4:
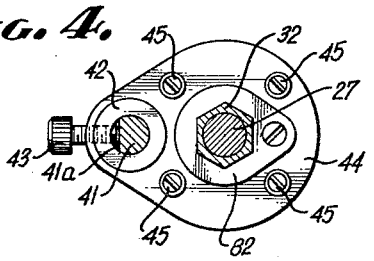
FIG. 4 is a transverse sectional view taken in the plane indicated by line 4—4 of FIG. 3.

Before describing operation of the stud gun it should be noted that the maximum travel of the unitary armature means or assembly which includes the armature member 24, the armature portion 27, the stud holder 30 and the stud 28, is indicated by the dimension M in FIG. 3, such dimension M being the distance between the end face 84 of the bolt 81 and the opposed surface of the end cap 14. Distance M must be less than the space between the opposed faces of the fixed core member 22 and the armature member 24

The distance that the stud 28 will move in its plunge into the molten metal of the work member 34 is determined by adjustment of the end face of ferrule 29 with respect to the welding end of the stud 28. Such distance is indicated at P. Distance P may be readily adjusted by moving leg 41 relative to the housing 10 and securing the same at a selected position. Since the stud 28 and the ferrule 29 are manufactured within close tolerances, a preselected plunge distance P originally set for a particular length of stud and for a particular ferrule will be maintained during subsequent welds.

The length of arc is readily determined and set by the arc adjustment means 80 and is indicated by the distance A, FIG. 3. Such distance A may be readily determined by the distance between the edge face 84 and the opposed face of the cap 14 when the stud 28 is pressed against the surface of the work member and the unitary armature means is pressed inwardly until the edge face of the ferrule 29 seats on the surface of the work member 34. Thus the sum of the arc length A and the plunge distance P is equal to the travel distance M.

In operation, an operator may grasp the grip means 12 to position the stud gun so that stud 28 touches work member 34. The operator then applies sufficient pressure on the stud gun to move the ferrule 29 into full or square seating contact with the surface of the work member. Such pressure urges the unitary armature means inwardly and compresses the solenoid coil-spring, the deflection of the spring 26 being equivalent to the plunge distance P. It will be noted that the travel adjustment distance M has now been reduced to the distance A or the arc length travel.

When the operator presses the pushbutton 51 to close switch elements 53, 52, a control timer circuit is energized within the control timer box 75 which causes the circuit breaker 76 to close for a preselected period of time. Welding current then flows from the generator 60 in the circuit as above described and as the welding current flows through the solenoid coil-spring 26 the armature member 24 is subjected to an electromagnetic field which moves the single unitary armature means toward the fixed core member 22. The amount of this distance is determined by the arc length A and the welding current flowing through the stud 28 establishes an arc between the end of the stud 28 and the work member 34. Such further movement of the armature member 24 further compresses the spring 26, the deflection thereof being equivalent to the arc length A.

During the arcing period a welding end portion of the stud is melted off and is deposited upon the surface of the work member 34 which has been heated in the arcing area and a portion thereof has become molten. Ferrule 29 acts as an arc shield and also confines the molten metal.

At a preselected time flow of welding current ceases by opening of the circuit breaker 76. Simultaneously with the ending of welding current flow the electromagnetic field disappears and the solenoid coil-spring now utilizes its potential spring energy to drive and plunge the welding end of stud 29 into the molten weld metal in order to complete the weld. The operator may then release pressure on the stud gun and withdraw the gun from the work member along the longitudinal axis of the stud. The stud holder 30 is thus disengaged from the end of stud 28. The ferrule 29 usually remains about the base of the stud at the weld and may be removed therefrom in any suitable manner, it being understood that the ferrule 29 may be made of frangible material.

It is important to note the construction and operation of the electromechanical device or solenoid means 20. Since the pulling power of a solenoid is proportional to the number of turns a very large pulling power per unit of barrel length is obtained in the above gun by the construction above described. Solenoid coil-spring 26 extends for a major portion of the length of the barrel 11 and therefore may include a relatively large number of turns while keeping the over-all size of the stud gun relatively small. Ordinary welding currents energizing solenoid means 20 will produce a pulling (or retracting) force of much greater magnitude than such ordinary current would normally produce. When a welding current of low value is used, the solenoid means 20 will produce what has been considered a normal pulling force. Thus the advantage of large pulling power of the solenoid means under normal current values facilitates proper operation of the stud gun by overcoming high frictional forces, conditions of binding and maintenance of quick action of the stud gun under adverse industrial conditions. Under low welding currents normal pulling power is available and stud welding to thin gauge metals and to aluminum is facilitated. All of these advantages are achieved by use of a solenoid coil spring which is capable of serving as a path for flow of welding current and serving to store spring potential energy produced or created by reason of said current flow.

It is also important to note that the moving parts within the stud gun above described have been reduced to a minimum. When solenoid coil-spring 26 is permanently attached to the armature member 24 and the fixed core member 22 as by soldering or brazing in order to provide a proper electrical connection, there remains but one unitary single moving assembly within the barrel of the gun, namely, the armature means comprising the armature member 24, armature portion 27, stud holder 30 and the releasable stud 28. Such simplified construction minimizes maintenance of the gun and when maintenance is necessary it may be readily performed and accomplished by reason of the simple construction of the gun.

FIG. 3 also illustrates a different modification of the arc adjustment means which may be used in place of the described adjustment means 80. In describing the modification like parts will be assigned like reference numerals with the prime sign.

In FIG. 3, the fixed core member 22 may be provided with an axial bore 90 having a threaded portion 91 in the end thereof adjacent armature member 24. An adjustment pin or bolt 81' may be received in said bore 90 and may be provided threaded engagement with the threaded portion 91, said bolt having an end face 84' projecting from the end face of the fixed core member 22. The distance between the end face 84' and the opposed end face of the armature member 24 is indicated by M' which is the travel distance of the armature means. It will be apparent that bolt 81' must be made of dielectric material or other suitable means may be used to insulate the end of bolt 81' from the armature member 24. Adjustment of the position of bolt 81' may be made by removing the end cap 13 and turning bolt 81' as by means of a screwdriver. It will be readily apparent that the bolt 81' functions in the same manner as the bolt 81 to determine travel of the armature means.

It will be readily understood by those skilled in the art that various modifications and changes may be made in the construction of the welding stud gun described above and which come within the spirit of this invention, and all such modifications and changes coming within the scope of the appended claims are embraced thereby.

I claim:

1. A light weight compact stud welding device characterized by a welding arc of predetermined constant length to be drawn between a stud and work piece and wherein such arc length may be selectively adjusted for studs of different size, comprising: a housing having a port at one end; solenoid-spring means positioned within said housing in dielectric relation thereto comprising a fixed core, a longitudinally movable armature spaced from said fixed core and having a portion extending through said port, and a single unitary solenoid coil spring of homogeneous material seated in electrical contact at one end on said fixed core and at the other end on said armature, said spring being normally under compression between said fixed core and said movable armature; means for holding a welding stud on said armature portion; ferrule supporting and positioning means mounted on said housing to hold a ferrule about the end of said welding stud, said stud normally extending beyond said ferrule a selected plunge distance and being moved against the bias of said solenoid-spring means the plunge distance when pressed against a work piece to place said ferrule against said work piece; means for energizing said solenoid-spring means to further retract said armature and stud and to draw a welding arc between said stud and said work piece, said welding arc having a length equal to the overall travel of said armature and stud minus said plunge distance; and adjustable means for selecting a welding arc length for a stud of selected size.

2. A device as in claim 1 wherein said adjustable means for the arc length comprises: an adjustable stop member mounted on said armature in offset relation thereto and adapted to limit retraction of said armature toward said fixed core, said housing having means for contact by said stop member.

3. A device as in claim 1 wherein said adjustable means for the arc length comprises: an adjustable dielectric stop pin carried by said fixed core and projecting forwardly toward said armature to abut thereagainst when said armature is retracted.

4. The device of claim 1 wherein said ferrule supporting and positioning means comprise: an extension leg slidably mounted on said housing longitudinally thereof and extending forwardly of said housing; a foot member carried by a forward end of said extension leg, means for lateral adjustment of said foot member relative to said leg, said foot member having a port to receive a stud therethrough and having a recess therein coaxial with said port; and an axially ported ferrule receiving means disposed in said recess and adapted to hold a ferrule therein, said ferrule receiving means being thereby selectively positionable both laterally and longitudinally relative to said stud to receive said stud therethrough and to control said plunge distance.

5. In combination a lightweight compact stud welding gun having a pistol grip means comprising: an elongated housing having a port at one end and a pistol grip housing adjacent the other end; solenoid-spring means positioned within said housing in dielectric relation thereto comprising a fixed core adjacent said other end of said housing, a longitudinally movable armature spaced from said fixed core and having an armature portion extending through said port, and a single unitary solenoid coil spring of homogeneous material seated in electrical contact at one end on said fixed core and at the other end on said armature; means for holding a welding stud on said armature portion; adjustable ferrule holding means carried by said elongated housing for positioning a ferrule adjacent the end of said welding stud, adjustable means carried by the armature portion for cooperation with said elongated housing and with said adjustable ferrule means for determining a welding arc length between a work piece and the adjacent end of said stud; means for energizing said solenoid-spring means to retract said armature and stud to draw a welding arc, said energizing means including a connector pin fixed in said pistol grip housing, said fixed core having a recess opposite said pin, said pin having an end extending into said recess for holding said fixed core stationary while providing an electrical contact therewith.

6. In a stud welding device including a barrel housing and a pistol grip housing, holding means for a stud at one end of the barrel housing, electro-magnetic means including a spring means, a fixed core member and a movable armature member, said fixed core member and armature member being electrically connected, said holding means being electrically and mechanically connected to said armature member; the provision of: an adjustable ferrule supporting and positioning means supported from said barrel housing in cooperable relation with respect to a stud held by said holding means; adjustable means carried by one of said members of said electro-magnetic means, said latter adjustable means and said adjustable ferrule supporting and positioning means being cooperable to establish a welding arc length between the end of said stud and a work piece.

7. In combination, a light weight compact stud welding gun having a pistol grip means comprising: an elongated barrel housing having a port at one end and a pistol grip housing adjacent the other end; electro-magnetic means positioned within said barrel housing and comprising a fixed core member, a movable armature member spaced from said fixed core member, and a spring means urging said armature member from said fixed core member; holding means for a welding stud on said armature member; means for energizing said electro-magnetic means comprisng a connector pin carried in said pistol grip housing and connected with said fixed core member; adjustable ferrule holding means carried by said barrel housing for positioning a ferrule in cooperable relation to the end of a welding stud; and adjustable means carried by one of the members of said electro-magnetic means for cooperation with said adjustable ferrule means for determining the length of a welding arc between the end of said stud and a work piece.

8. In a stud welding device including a barrel housing, holding means for a stud at one end of the barrel housing, electro-magnetic means carried by said housing and including a spring means, a fixed core member and an armature member, said armature member projecting from said housing and spaced from said fixed core member, said stud holding means being electrically and mechanically connected to said armature member; the provision of: an adjustable ferrule supporting means carried by said barrel housing and extending into cooperable relation with a stud held by said holding means for determining plunge distance of said stud for a welding operation; and means carried by one of the members of said electro-magnetic means for adjusting the length of retraction of said armature member when said electro-magnetic means is energized during a welding operation, and thereby determining and adjustably establishing a welding arc length in respect to said plunge distance.

References Cited in the file of this patent

UNITED STATES PATENTS

| | | |
|---|---|---|
| 2,129,899 | Young | Sept. 13, 1938 |
| 2,416,454 | Morton et al. | Feb. 25, 1947 |
| 2,416,915 | Evans | Mar. 4, 1947 |
| 2,816,210 | Moury | Dec. 10, 1957 |